United States Patent [19]

Kanamuller et al.

[11] Patent Number: 4,493,993

[45] Date of Patent: Jan. 15, 1985

[54] APPARATUS FOR OPTICALLY DETECTING INK DROPLETS

[75] Inventors: Franz X. Kanamuller, Glenside; Edwin R. Phillips, Rosemont, both of Pa.

[73] Assignee: Sperry Corporation, New York, N.Y.

[21] Appl. No.: 443,405

[22] Filed: Nov. 22, 1982

[51] Int. Cl.$^3$ .................... G01V 9/04

[52] U.S. Cl. .................... 250/222.1; 346/75; 346/140 R

[58] Field of Search .................... 346/75, 140 R; 250/231 R, 222.1, 227

[56] References Cited

U.S. PATENT DOCUMENTS

| | | | |
|---|---|---|---|
| 3,870,884 | 3/1975 | Williams | 250/339 |
| 3,956,987 | 5/1976 | Alix | 101/425 |
| 3,958,509 | 5/1976 | Murray et al. | 101/426 |
| 4,176,363 | 11/1979 | Kashahara | 346/140 |
| 4,255,754 | 3/1981 | Crean et al. | 250/227 |
| 4,323,905 | 4/1982 | Reitberger et al. | 346/75 |
| 4,328,504 | 5/1982 | Weber et al. | 346/75 |
| 4,392,142 | 7/1983 | Seachman et al. | 346/140 |
| 4,410,895 | 10/1983 | Houston et al. | 346/75 |

FOREIGN PATENT DOCUMENTS

| | | | |
|---|---|---|---|
| 689 | 2/1979 | Fed. Rep. of Germany | 101/DIG. 24 |
| 2444300 | 12/1978 | France | 101/DIG. 24 |
| 87554 | 7/1980 | Japan | 101/DIG. 24 |
| 2012213 | 12/1978 | United Kingdom | 101/DIG. 24 |
| 2022514 | 6/1979 | United Kingdom | 101/DIG. 24 |
| 719895 | 3/1978 | U.S.S.R. | 101/DIG. 24 |

*Primary Examiner*—David C. Nelms
*Assistant Examiner*—James Gatto
*Attorney, Agent, or Firm*—James R. Bell; Thomas J. Scott; Marshall M. Truex

[57] ABSTRACT

Ink jet printers include orifices which may become clogged or otherwise inoperative. This can cause printing defects which may go undetected for a substantial period because these printers usually operate unattended. An optical detector is provided for testing the operability of each ink jet orifice prior to the beginning of printing either a print cycle or a page. Ink is deposited on a member which moves the deposit through an optical path for detection. Absence of a deposit signals a malfunction.

13 Claims, 6 Drawing Figures

APPARATUS FOR OPTICALLY DETECTING INK DROPLETS

BACKGROUND OF THE INVENTION

1. Field of the Invention

This invention relates generally to printers having ink jet heads and more particularly to those including means for detecting whether an orifice of the head has become obstructed and is therefore inoperative.

2. Description of the Prior Art

Ink jet printers are available for printing characters and graphics in a matrix configuration. These printers use a head having either a single orifice or multiple orifices for printing in either color or black and white.

One type of these printers operates on a "drop on demand" principle while another type ejects a continuous stream of electrically charged droplets which are deflected by an electrical field.

A limitation of these printers is that an orifice can clog or otherwise become obstructed. Usually these printers are unattended during operation. Therefore, several pages of defective printing can be produced before a clogged orifice is detected.

The foregoing illustrates limitations of the known prior art. Thus, it is apparent that it would be advantageous to provide an alternative directed to overcoming one or more of the limitations as set forth above. Accordingly, a suitable alternative is provided including features more fully disclosed hereinafter.

SUMMARY OF THE INVENTION

In one aspect of the present invention, this is accomplished by providing apparatus for optically detecting ink droplets including light emitting means for emitting a light signal and light receiving means for receiving the signal. The light is relayed from the light emitter to the light receiver by a relay member which is movable from a first position wherein ink is deposited thereon to a second position wherein the deposited ink interrupts relay of the light signal.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
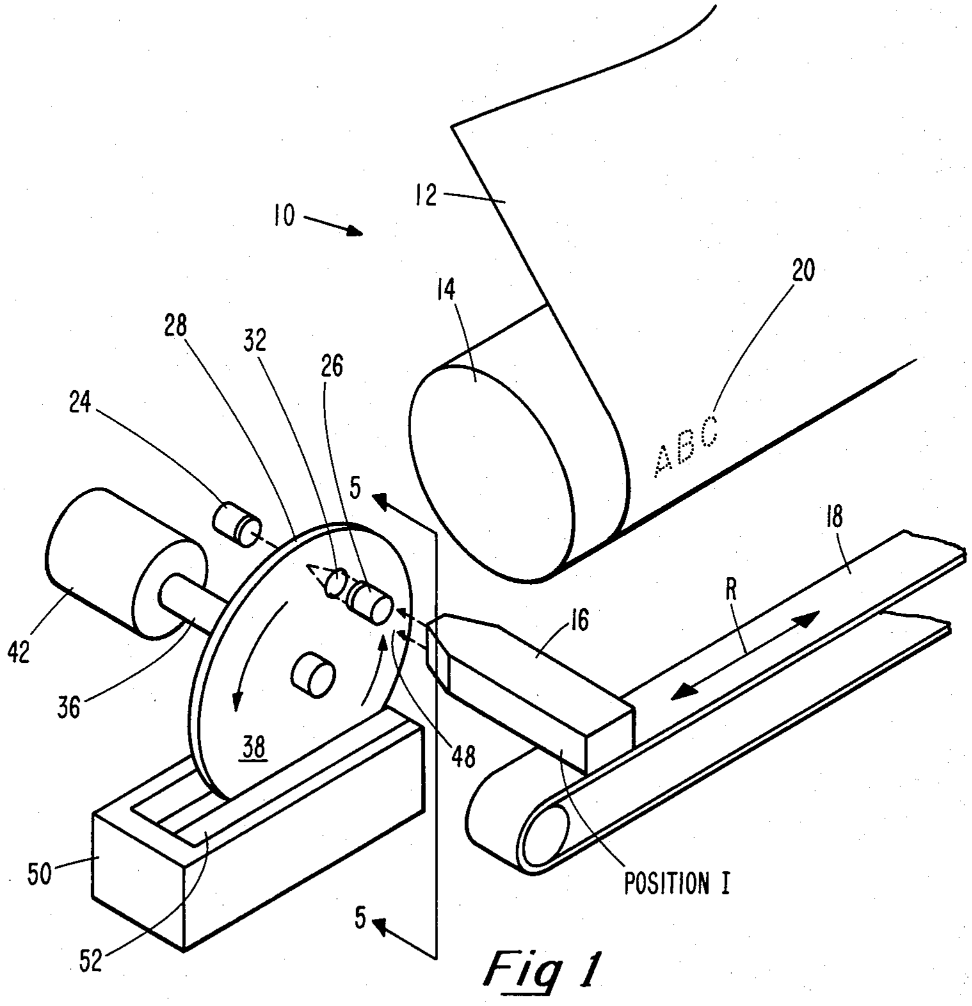
FIG. 1 is an isometric view illustrating an embodiment of the present invention.

An exemplary ink jet printer is generally designated 10 in FIG. 1 and includes a continuous web of printing medium 12 moving across a platen 14. A print head 16 is reciprocated as indicated by the directional arrow designated R, by a movable belt 18. Head 16 is of the type having a plurality of orifices for supplying ink therethrough thus printing characters designated 20 on medium 12. An example of one such printer 10 is the model no. ACT 1 manufactured by Advanced Color Technology Co.

Figure 2:
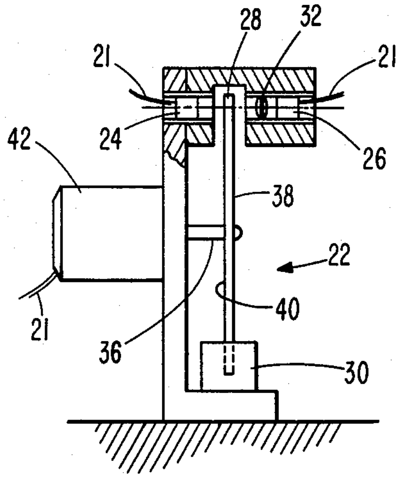
FIG. 2 is a side view graphically illustrating an embodiment of this invention.

Apparatus, generally designated 22, FIG. 2, of this invention comprises a light emitting means 24, a light receiving means 26, light relaying means 28, means 30 for cleaning ink from the light relaying means 28 and a lens 32 mounted adjacent light receiving means 26. Apparatus 22 can be readily adapted for use with printer 10. Power for apparatus 22 can be derived from printer 10.

FIGS. 1 and 2 illustrate the preferred embodiment of this invention wherein apparatus 22 includes light relaying means 28 formed as a disk of transparent commercially available synthetic resin material such as the product sold under the name Plexiglas. Disk 28 is mounted to be rotated by a shaft 36 and includes a first surface 38 and a second surface 40. Shaft 36 is rotatably driven by a motor 42 such as model no. 247 manufactured by Bristol Saybrook Co. Light emitting means 24 is mounted adjacent surface 40 whereas lens 32 and light receiving means 26 are adjacent surface 38.

Disk 28 can be adapted either for constant rotation or for rotation in response to a signal produced when head 16 of printer 10 deposits ink on disk 28. Also, head 16 can be modified on belt 18 to move beyond platen 14 and medium 12 into position I for depositing an ink droplet 48 on disk 28 for the purpose of testing for an obstructed ink orifice. Such testing would preferably be accomplished prior to beginning each print cycle or each page. Ordinarily, it is uncommon for an orifice to clog after printing has begun. Normally, clogging occurs after extended periods of non-use. Also, well known "out-of-ink" detectors are available to signal when printing ceases after a print cycle or page has already begun.

Light emitting means 24 is a commercially available LED such as for example model no. OP 160 manufactured by Optronics, Inc. In FIGS. 1 and 2, LED 24 directs a beam of light through transparent disk 28, through lens 32 and to light receiving means 26 such as a photo detector model no. OP 500 manufactured by Optronics, Inc. Power for LED 24, photo detector 26 and motor 42 can be derived from printer 10 via wires 21.

Figure 6:
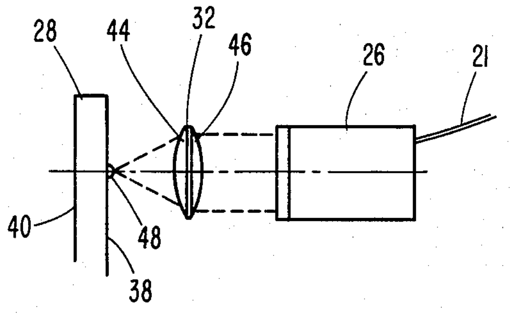
FIG. 6 is a partial, exploded view graphically illustrating an embodiment of the invention.

Referring now to FIG. 6 it is graphically shown that an exemplary lens 32 includes convex surfaces 44, 46. Lens 32 can be model no. 01 LDX 001 manufactured by Melles Griot Co. One of the surfaces 44 is adjacent disk 28 and the other surface 46 is adjacent photo detector 26. In this manner, as illustrated in FIG. 6, the image of ink droplet 48, on surface 38 of disk 28 is magnified or enlarged by lens 32 to a size sufficient to block or interrupt light emitted from LED 24. Such blockage of light can indicate to photo detector 26 that there is ink flow from head 16 and that head 16 is ready to print. Absence of droplet 48 permits light to be received by photo detector 26 and indicates a defect. In response, printer 10 can be adapted to react in a corrective manner. For example, an audio alarm could sound to inform an operator of a malfunction. The operator can then manually intervene to purge the ink system, to clean head 16 or to merely shut down the printer 10. Purging or shut down could also be automatic. Further, printer 10 could be adapted to indicate which orifice is defective on a multi-jet head.

Ink droplets deposited on surface 38 of disk 28 are removed by cleaning means 30 comprising a retainer 50 including a suitable absorbing pad 52 positioned to wipe surface 38 as disk 28 rotates.

Figure 5:
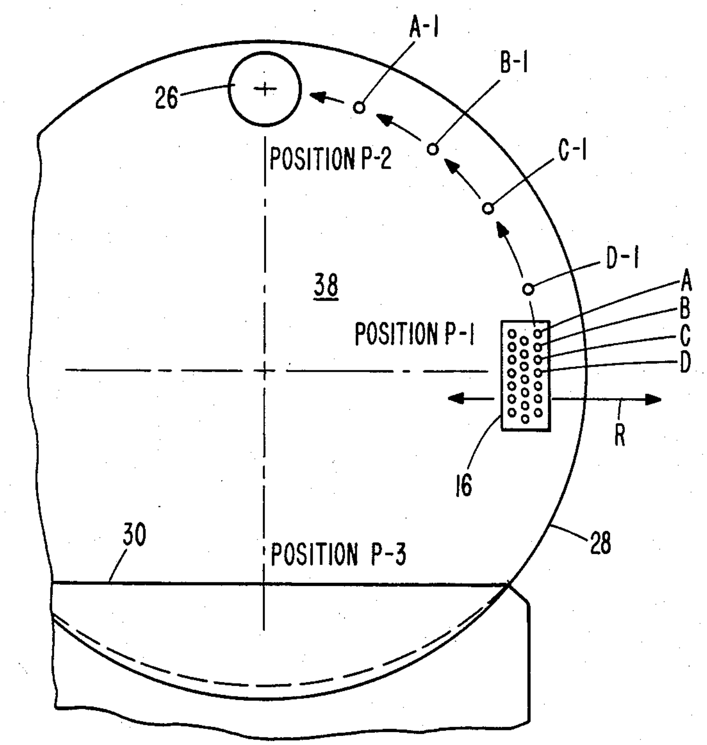
FIG. 5 is a view taken along line 5—5 of FIG. 1.

FIG. 5 illustrates a view of an exemplary multi-jet head 16 having a plurality of orifices, some of which are designated A, B, C and D. It can be seen that corresponding droplets A-1, B-1, C-1 and D-1, which have been deposited on surface 38 of disk 28, move along an arcuate path from a first position P-1, where deposit occurs, to a second position P-2, where detection occurs by photo detector 26. It can be seen that further arcuate movement of the droplets to a position P-3 will cause the droplets to be removed from disk 28 by cleaning means 30.

Figure 3:
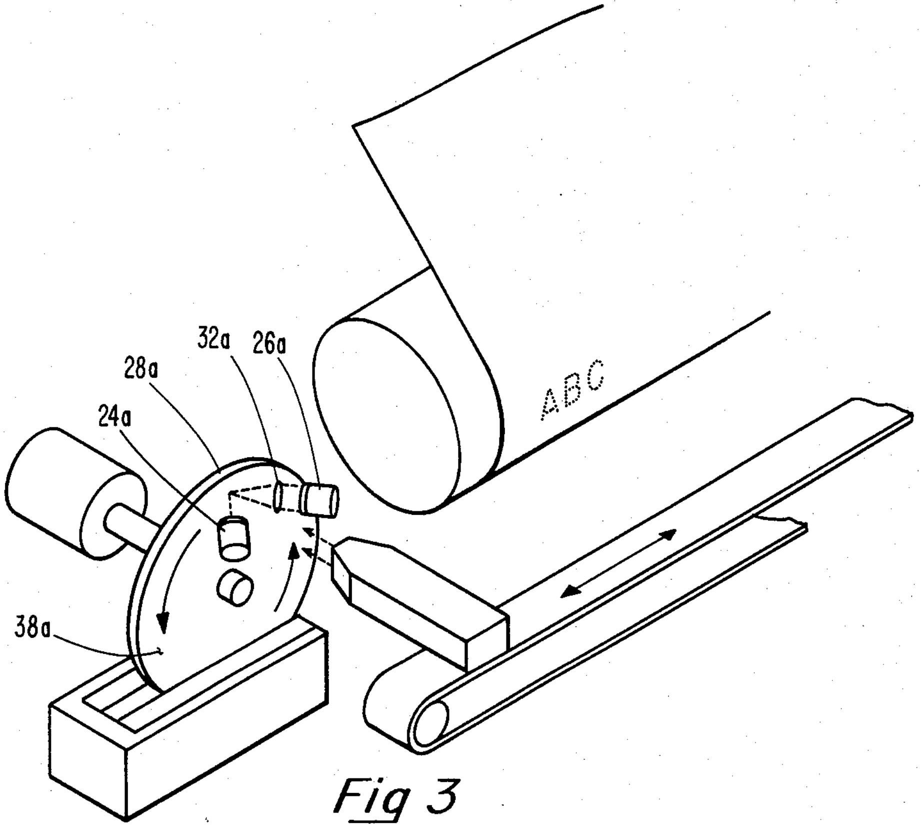
FIG. 3 is an isometric view illustrating another embodiment of the present invention.

In the alternative, FIG. 3 illustrates that disk **28*a* can include a reflective surface 38*a*. In this case, LED 24*a*, lens 32*a* and photo detector 26*a* are mounted adjacent reflective surface 38*a*. Lens 32*a* and photo detector 26*a* are positioned to receive light from LED 24*a* as that light is reflected from surface 38*a*. Disk 28*a*** is preferably formed of polished aluminum.

Figure 4:
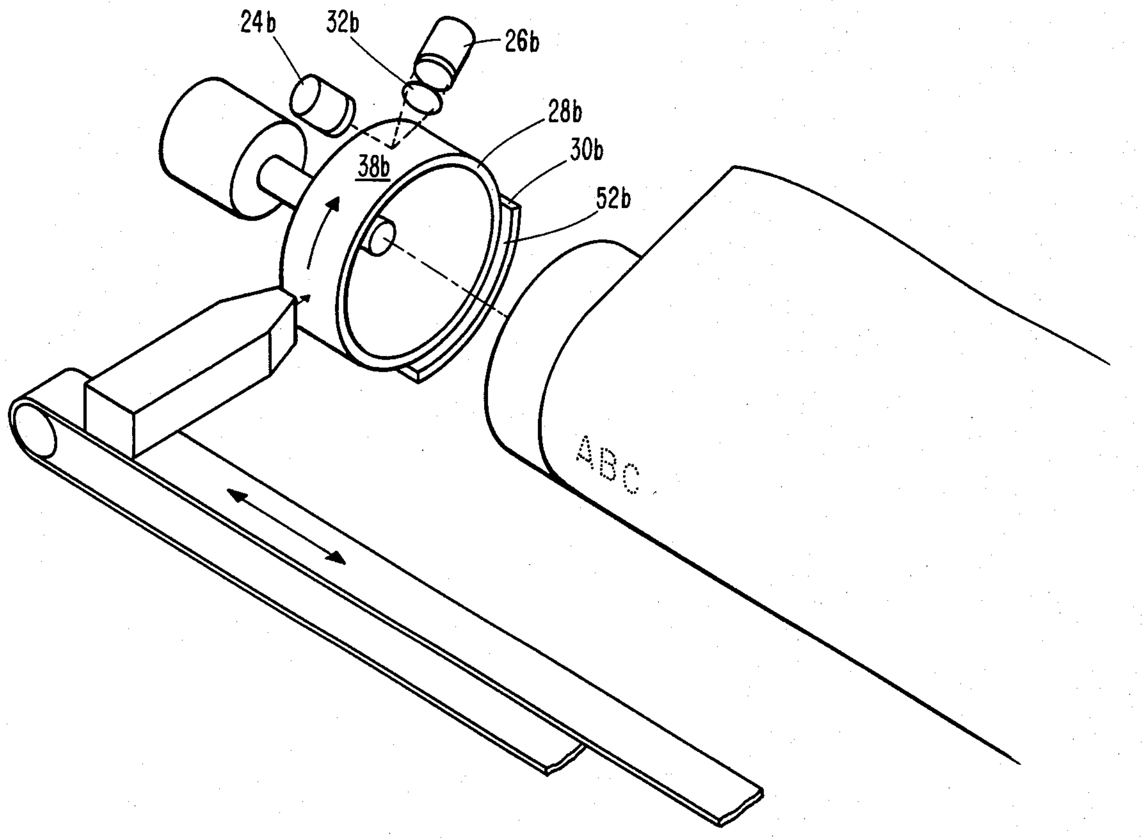
FIG. 4 is an isometric view illustrating still another embodiment of the present invention.

In another alternative, FIG. 4 illustrates that disk 28 can be replaced by a rotating cylinder or drum **28*b* having a reflective surface 38*b*. LED 24*b*, lens 32*b* and photo detector 26*b* are positioned as in FIG. 3. Cleaning means 30*b* can comprise an arcuate absorbing pad 52*b* which conforms to the curvature of reflective surface 38*b*. Drum 28*b*** is preferably formed of polished aluminum.

In operation, printer 10 can be adapted to accommodate apparatus 22. Prior to the beginning of printing a print cycle or a page, belt 18 moves head 16 to position I. Photo detector 26 receives a beam of light emitted from LED 24. The beam passes through transparent disk 28 and lens 32.

Head 16 deposits ink droplet 48 on rotating disk 28 at position P-1. Droplet 48 moves to position P-2 where it is magnified to block light received by photo detector 26. Printer 10 either stops printing when photo detector 26 receives the light beam from LED 24, or, proceeds with printing when the beam is blocked. Also, if desired, printer 10 can be adapted to indicate which orifice is defective on a multi-jet head and further automatically initiate corrective action. In the alternative, printer 10 can be adapted to sound an alarm notifying an operator that manual intervention is required. Moreover, droplet 48 can move to position P-3 and be removed from disk 28 by cleaning means 30.

The foregoing has described an apparatus for optically detecting the presence or absence of ink droplets deposited by an orifice of an ink jet printer.

It is anticipated that aspects of the present invention, other than those specifically defined in the appended claims, can be obtained from the foregoing description and the drawings.

Having thus described the invention, what is claimed is:

1. An apparatus for optically detecting ink droplets comprising:

light emitting means operably connected to said apparatus for emitting a light signal;

light receiving means operably connected to said apparatus receiving said light signal;

light relaying means operable for relaying said light signal from said emitting to said receiving means, said relaying means movable from a first position wherein ink is deposited thereon to a second position wherein said deposited ink interrupts relay of said light signal.

2. The apparatus of claim 1 including:

means for cleaning said ink from said light relaying means in response to said light relaying means moving to a third position.

3. The apparatus of claim 2 wherein said relaying means is mounted on a member for rotating movement.

4. The apparatus of claim 3 including:

means operably connected for rotating said relaying means through said first, second and third positions.

5. The apparatus of claim 1 including:

a lens mounted adjacent said light receiving means.

6. The apparatus of claim 5 wherein said light relaying means is a transparent disk.

7. The apparatus of claim 6 wherein said light receiving means and said lens are adjacent a first surface of said disk and said light emitting means is adjacent a second surface of said disk opposite said first surface.

8. The apparatus of claim 7 wherein said light emitting means is positioned to emit a light signal through said transparent disk and to said light receiving means.

9. The apparatus of claim 8 wherein said lens is positioned to magnify said ink deposit sufficient to block said light signal received by said light receiving means.

10. The apparatus of claim 5 wherein said light relaying means includes a reflective surface.

11. The apparatus of claim 10 wherein said light emitting means, said lens and said light receiving means are adjacent said reflective surface.

12. The apparatus of claim 11 wherein said light emitting means is positioned to emit a light signal to said reflective surface and said light receiving means is positioned to receive said signal in response to said signal being reflected from said reflective surface.

13. The apparatus of claim 12 wherein said lens is positioned to magnify said ink deposit sufficient to block said light signal received by said light receiving means.

* * * * *